United States Patent [19]

Wertheimer

[11] Patent Number: 5,124,542
[45] Date of Patent: Jun. 23, 1992

[54] METHOD FOR QUANTITATIVELY DETERMINING PETAL PISTON IN A SEGMENTED IMAGING ASSEMBLY

[75] Inventor: Alan L. Wertheimer, Pittsford, N.Y.

[73] Assignee: Eastman Kodak Company, Rochester, N.Y.

[21] Appl. No.: 621,400

[22] Filed: Nov. 30, 1990

[51] Int. Cl.$^5$ ............................................. G01J 1/20
[52] U.S. Cl. .................... 250/201.9; 356/121
[58] Field of Search ............... 250/201.9; 356/121, 356/124; 359/849, 850

[56] References Cited

U.S. PATENT DOCUMENTS

4,725,138  2/1988  Wirth et al. ............... 250/201.9
5,017,004  5/1991  Cross et al. ................... 356/121

Primary Examiner—David C. Nelms
Attorney, Agent, or Firm—Stephen C. Kaufman

[57] ABSTRACT

A method suitable for determining piston in a segmented imaging assembly. The assembly preferably comprises a source of radiation that outputs a radiation beam; and, a segmented imaging system comprising a reference component and a test component, which components can be used to form an imaged radiation beam. The method comprises the steps of intercepting preselected portions of the imaged radiation beam with a mask, for masking at least one portion of at least one of the reference component and the test component, so that a portion of the imaged radiation beam incurs a predetermined and differential phase retardation, relative to another portion of the beam passing through the mask. These actions create a real time masked image. A step of comparing the real time masked image against a family of off-line images generated for a sequence of known petal position errors, can provide a determination of the magnitude of the real time test component piston.

8 Claims, 12 Drawing Sheets

FIG. 1

SECTION A-A

| PISTON OPD (WAVES) | HIGHEST LEFT PEAK INTENSITY | HIGHEST RIGHT PEAK INTENSITY | (A) RATIO OF LEFT/RIGHT PEAK INTENSITY | (B) RATIO OF (LEFT-RIGHT) TO (LEFT+RIGHT) |
|---|---|---|---|---|
| 0 | 2.5 UNITS | 2.5 UNITS | 1.0 | 0.0 |
| 1/40 | 2.6 | 2.5 | 1.083 | 0.040 |
| -1/40 | 2.5 | 2.6 | 0.923 | -0.040 |
| 1/20 | 2.7 | 2.3 | 1.174 | 0.080 |
| -1/20 | 2.3 | 2.7 | 0.851 | -0.080 |
| 1/10 | 2.9 | 2.1 | 1.381 | 0.160 |
| -1/10 | 2.1 | 2.9 | 0.724 | -0.160 |
| 1/8 | 2.9 | 2.0 | 1.45 | 0.184 |
| -1/8 | 2.0 | 2.9 | 0.690 | -0.184 |
| 1/4 | 3.0 | 1.5 | 2.0 | 0.33 |
| -1/4 | 1.5 | 3.0 | 0.5 | -0.33 |
| 3/8 | 3.0 | 2.0 | 1.5 | 0.20 |
| -3/8 | 2.0 | 3.0 | 0.667 | -0.20 |
| 1/2 | 2.5 | 2.5 | 1.0 | 0.0 |
| -1/2 | 2.5 | 2.5 | 1.0 | 0.0 |

METHOD FOR QUANTITATIVELY DETERMINING PETAL PISTON IN A SEGMENTED IMAGING ASSEMBLY

FIELD OF THE INVENTION

This invention relates to a method for determining petal piston in a segmented imaging assembly.

INTRODUCTION TO THE INVENTION

I am working on a segmented imaging assembly, in particular, a segmented optical imaging assembly.

Figure 1:
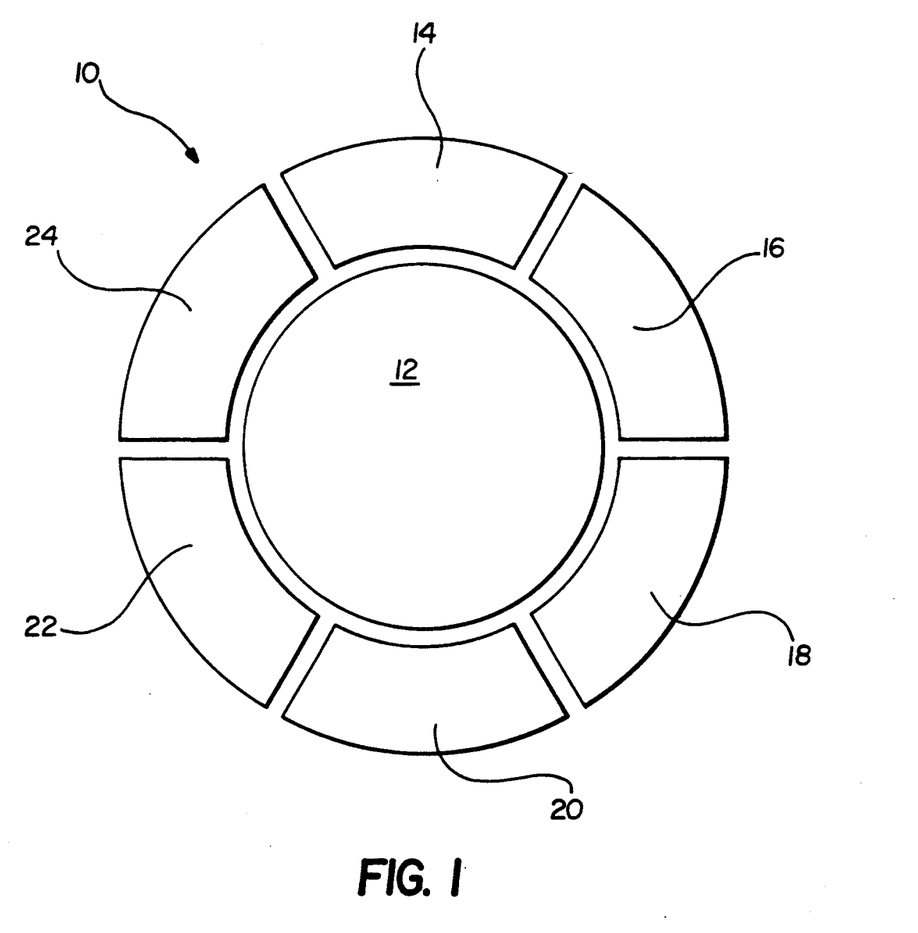
FIG. 1 shows a first example of a segmented optical imaging assembly.

One example of a segmented optical imaging assembly is shown in FIG. 1. The FIG. 1 segmented optical imaging assembly 10 (hereinafter, assembly 10) comprises a center mirror segment 12, and a set of six mirror segments, or petals (numerals 14-24). The petals (14-24) circumscribe the center mirror segment 12. The assembly 10 may be employed to accept source radiation, for example, light from a star, and collectively re-image the input source radiation at a unique focal point.

Figure 2A:
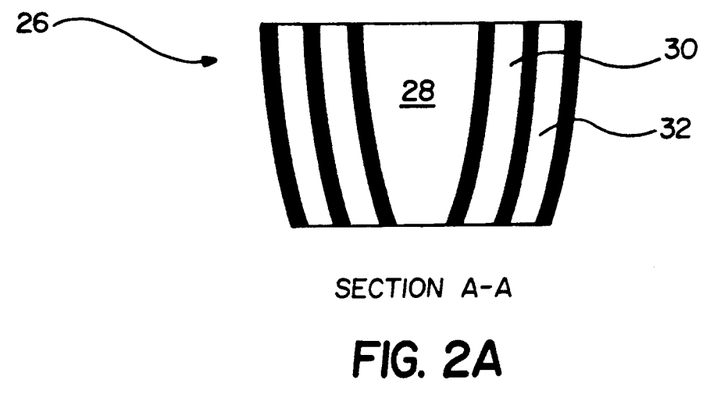
FIGS. 2A, 2B show a second example of a segmented optical imaging assembly.
Figure 2B:
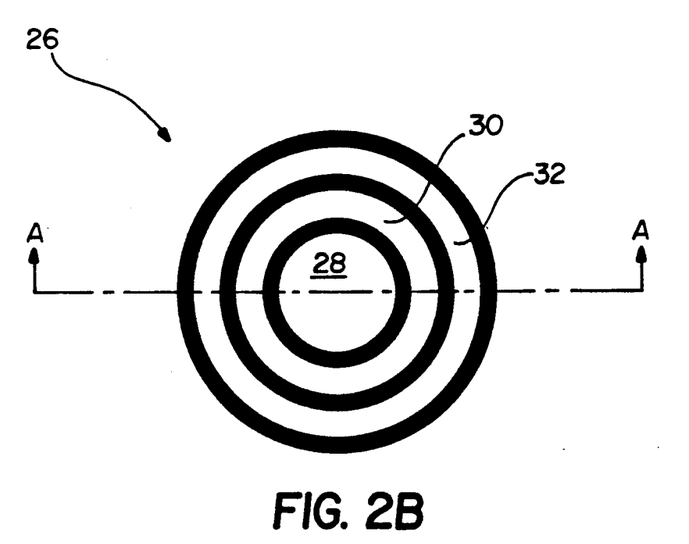

A second example of a segmented imaging assembly is shown in FIGS. 2A, B, comprising cross-sectional and top views, respectively. A FIG. 2 segmented optic 26 comprises a portion of an advanced X-ray astronomical telescope. In particular, the segmented optic 26 comprises a set of parabolically shaped, cylindrically nested, physically de-coupled, discrete mirror segments 28, 30, 32. The mirror segments (28-32), or petals, can cooperate to function as a grazing incident reflecting optical assembly.

The segmented imaging assemblies illustrated in FIGS. 1 and 2 are particular examples of segmented imaging assemblies. In general, and for purposes of the present invention, a segmented imaging assembly may be defined as an imaging assembly comprising at least two or more physically separate parts, e.g., petals, designed to act in an imaging function as a single, larger monolithic component.

It is indicated above that the present invention relates to a method for determining petal piston, in a segmented imaging assembly of the type just defined. The concept and a problem of petal piston are now explained, with continued reference, for purposes of pedagogy, to the FIG. 1 segmented optical imaging assembly 10, as well as reference to a FIG. 3.

Figure 3:
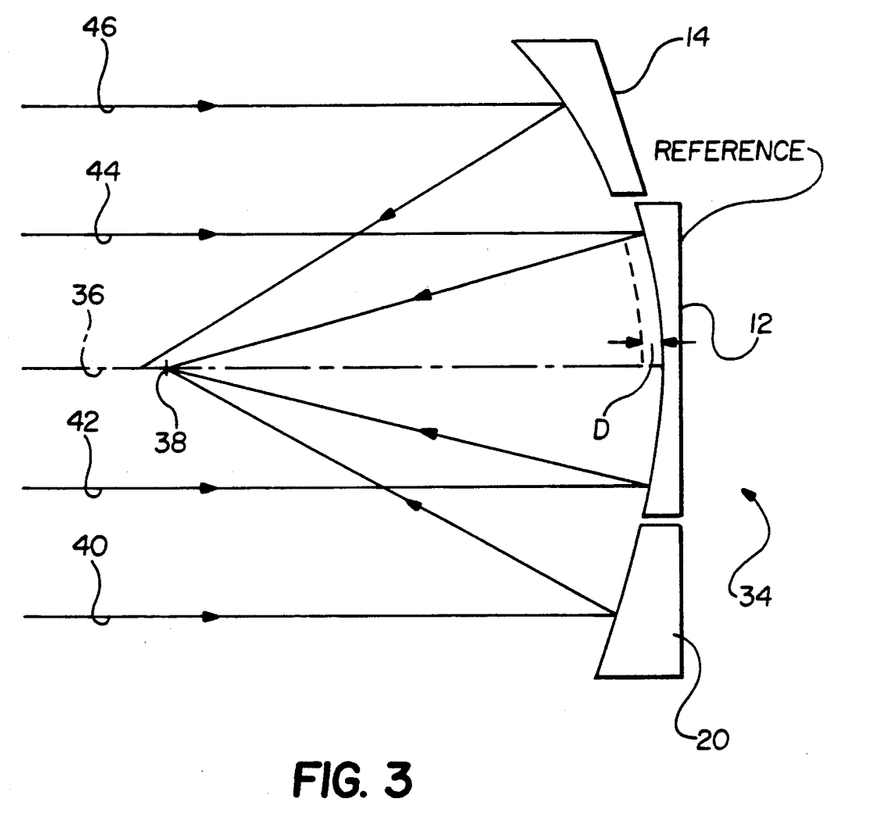
FIG. 3 shows a partial edge-view of the FIG. 1 segmented optical imaging assembly.

In particular, attention is now directed to FIG. 3, which shows a partial edge-view 34 of the FIG. 1 assembly 10. FIG. 3 shows the center mirror 12, the adjacent petals 14 and 20, an assembly optical axis 36, and a focal point 38 located on the assembly optical axis 36.

Now, it may be observed that the center mirror 12 and petal 20 define a continuous surface curvature, so that incoming radiation to the assembly 10, represented by rays of light 40, 42, and 44, may be uniquely returned to the focal point 38, by the tandem operation of the center mirror segment 12 and the petal 20. Thus, the source radiation from the segments 12 and 20 may be considered to be "in phase" with respect to the focal point 38. For this situation, one can say that there is no piston error between the center mirror 12 and adjacent petal 20.

For the situation of petal 14 in FIG. 3, however, there is petal piston. Piston has been induced by way of the parallel, translational displacement D of the petal segment 14, relative to the center 12. The displacement D is such that the center mirror segment 12 and the petal 14 no longer define a continuous surface curvature, but rather effect an abrupt curvature singularity. In effect, this displacement, which is the petal piston, induces an optical path difference (OPD) or phase retardation, between radiation wavefronts returned to the focal point 38 by the disparate segments 12, 14.

Note in FIG. 3 that there is also a small shift of the location of the focused radiation represented by ray 46. However, when piston D, which may be either positive or negative, is on the order of the wavelength of the radiation, and the dimension of the imaging aperture 34 is much greater than the wavelength of the radiation, the dominant effect is due to an electromagnetic interference between the beams of radiation from the various segments.

The piston error between segments 12 and 14 can result in a significant degradation of image quality everywhere in the region of the focal point 38, unless the piston error is eliminated, or at least reduced to a value very much less than one half of the wavelength of the radiation.

SUMMARY OF THE INVENTION

The problem of petal piston in a segmented imaging assembly, as defined above, is known, at least in a theoretical way. The necessity for its satisfactory solution remains, however, especially, and, in particular, for those cases where one must make high precision, low noise measurements of axial position errors or piston. For example, there is an important need in the art to conceptualize and provide an efficient, straightforward method for quantifying petal piston for high precision cases, typically defined as much less than one half wave OPD.

I have now discovered a method for quantitatively determining petal piston in a segmented imaging assembly that responds to this need for high precision and low noise measurement. The method is efficient, robust, and repeatable. An important advantage of the method is that it can provide a high quality input to, for example, a force actuator, to the end of re-establishing, in a known way, the relative phasing of the segments in a segmented imaging assembly.

The method is particularly suitable for determining piston in a segmented imaging assembly, the assembly comprising (a) a source of radiation that outputs a radiation beam; and (b) a segmented imaging system comprising a reference component and a test component, which components can be used to form an imaged radiation beam; the steps of the method of the present invention comprising:

1) intercepting preselected portions of the imaged radiation beam with a mask;

2) masking at least one preselected portion of at least one of the reference component and the test component, so that a portion of the imaged radiation beam incurs a predetermined and differential phase retardation relative to another portion of the beam passing through the mask, thereby creating a real time masked image; and 3) comparing the real time masked image against a family of off-line images generated for a sequence of known petal position errors, for determining the magnitude of the real time test component piston.

BRIEF DESCRIPTION OF THE DRAWING

The invention is illustrated in the accompanying drawing, in which.

DETAILED DESCRIPTION OF THE INVENTION

As summarized above, the method of the present invention is suitable for determining petal piston in a segmented imaging assembly. Breaking down the phrase, "segmented imaging assembly", note that the term "segmented" imaging assembly has been generally defined, above. Note, furthermore, that the term "imaging" assembly is one that is capable of imaging radiation over the entire electromagnetic spectrum, including, for example, the microwave, radiowave, or optical portions.

Figure 4:
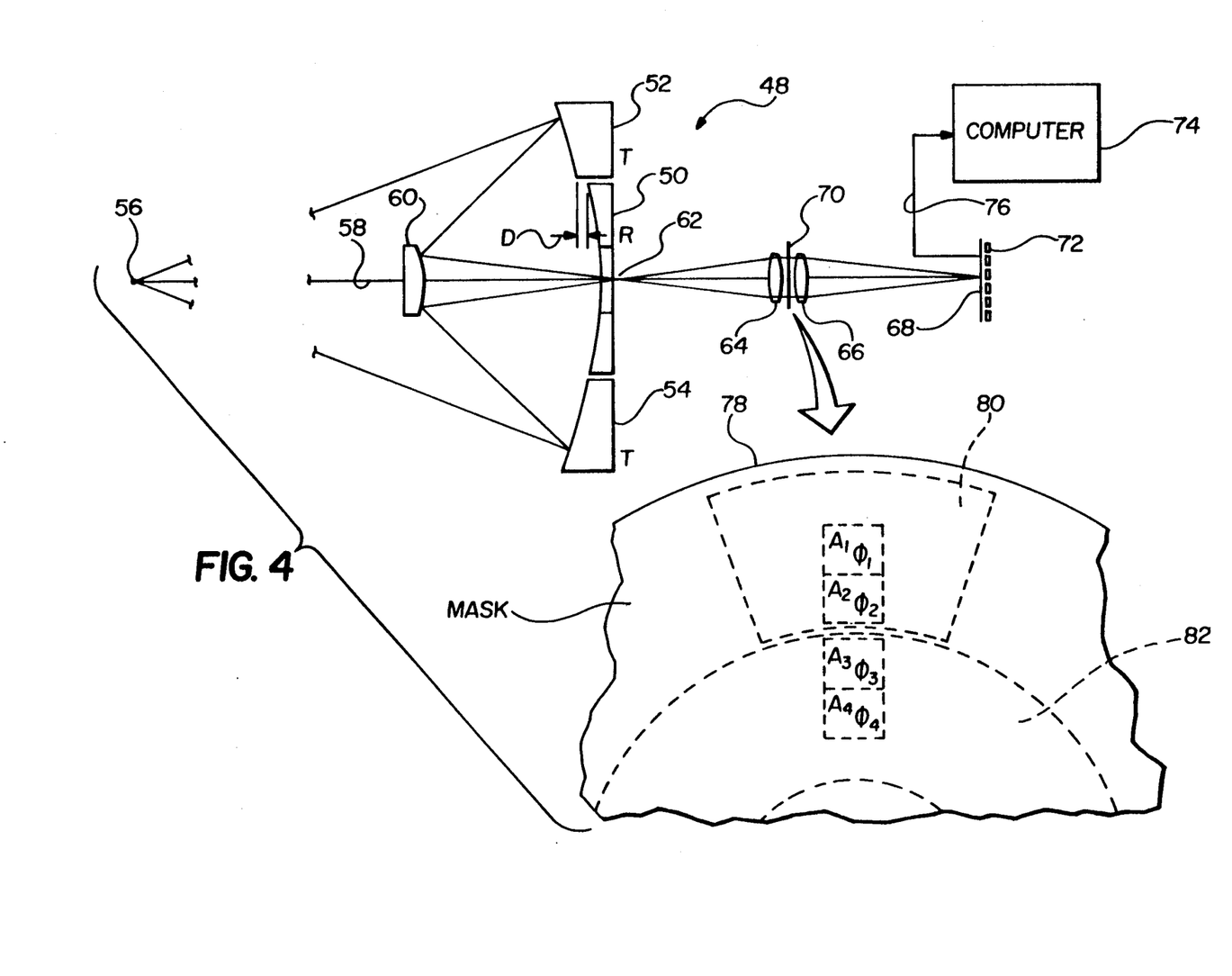
FIG. 4 shows a segmented optical imaging assembly used to demonstrate the steps of the present invention.

The method of the present invention is preferably demonstrated by reference to a segmented optical assembly, of the type shown in FIG. 4 as numeral 48.

The FIG. 4 optical assembly 48 comprises a segmented imaging system comprising a conventional mirror reference component 50, and arbitrarily spaced-apart ($D < \lambda/2$) conventional mirror test components 52 and 54. The mirror reference component 50 and the mirror test components 52, 54 are physically de-coupled imaging components, designed to act in an imaging function as a single, larger monolithic component. It is an objective of the method of the present invention, as disclosed in detail below, to provide a quantitative determination of a real time mirror test component piston of each component 52, 54, with respect to the mirror reference component 50.

Continuing, the FIG. 4 optical assembly 48 further includes a conventional monochromatic source of radiation 56, that can output a radiation beam along an assembly optical axis 58. (Note that the method of the present invention is not limited to a monochromatic point source of radiation, and may, for example, include a polychromatic point source of radiation.)

The FIG. 4 optical assembly 48 also includes a secondary mirror 60 that can function to form an image of the source 56 at a location 62, so that, in turn, this image may be relayed by a set of conventional lenses 64, 66 to a conjugate image plane 68. Note, further, that the location of the optics 60, 64, in turn, defines a location of a conjugate image plane 70, that is the image of the system 50, 52, 54.

The image at the conjugate image plane 68 is coincident with a conventional CCD photodetector 72. The CCD photodetector 72 can detect an image photon intensity distribution. A subsequent evaluation of point spread functions (PSF) corresponding to a photon intensity distribution, may be effected by way of a conventional computer 74, connected to the CCD photodetector 72, along a line 76.

As mentioned above, it is an objective of the method of the present invention to provide a quantitative determination of a real time test component 52 piston error, with respect to the reference component 50. This can be done in accordance with the three method steps summarized above, and now detailed.

Step 1: Intercepting Preselected Portions of the Imaged Radiation Beam with a Mask.

Step 1 of the present method requires intercepting preselected portions of an imaged radiation beam (formed by the test component 52 and the reference component 50), with a mask. This step 1 subsumes the following particulars.

First, as shown in FIG. 4, a mask 78 is preferably positioned at a normal to the optical axis 58, and coincident with the conjugate image plane 70. Second, the mask 78 is preferably positioned so that it can define the following geometric relationships to an image 80 of the test component 52 and an image 82 of the reference component 50. Thus, preliminarily, a portion of each of the reference component image 82 and the test component image 80 is preferably divided into regions or areas of equal halves ($A_1$, $A_2$), ($A_3$, $A_4$), as shown by dotted lines, and preferably such that $A_1 = A_2 = A_3 = A_4$. Then the mask 78, itself preferably comprising four regions ($\phi_1$, $\phi_2$, $\phi_3$, $\phi_4$), in this case dedicated to and corresponding to four phase retardation regions, (which may, or may not, have the same magnitude), is preferably aligned to the reference component image 82 and the test component image 80, as shown in FIG. 4.

It is just asserted that the mask preferably comprises four regions ($\phi_1$, $\phi_2$, $\phi_3$, $\phi_4$) dedicated to four phase retardation regions, and is opaque everywhere else. Attention is now directed to FIGS. 5A-D for details on how to make such a mask.

In general, the FIG. 5 mask preferably comprises a transparent, homogeneous and uniformly thick substrate, larger than the open regions $A_1$ through $A_4$, with an overlay comprising a thin film coating. The substrate may comprise, for example, glass, mica, or fused quartz. The thin film coating, on the other hand, may comprise fused quartz, magnesium fluoride or silicon dioxide, overlaid on the substrate by conventional techniques.

Note that the function of the FIG. 5 mask is to realize a desired series of phase retardations $\phi$: accordingly, the thin film coating, say, for example, one comprising magnesium fluoride on one portion and no coating on an adjacent portion, is typically from 0.6 to 0.9 microns thick, or such as to generate a phase retardation in transmission of approximately one-half wave of radiation of interest.

Restated, and generalized, the mask effects a predetermined and differential phase retardation $\phi$ in accordance with the following equation (1):

$$\phi = OPD = \frac{\text{thickness of overlay}}{\text{wavelength of radiation source}} \cdot (n_1 - n_2) \quad (1)$$

where $n_1$ and $n_2$ are the indices of refraction of the coating and portions adjacent to it, respectively, and OPD is the optical path difference, in the units of the wavelength of the radiation.

The FIGS. 5A-D detail four preferred geometric relationships defined by the substrate and the overlay. Note that for each of the four details, there is an identifying sub-region ($A_1$, $A_2$, $A_3$, $A_4$) and that areas outside of these sub-regions are opaque. Recall that these identifying sub-regions may be employed to align the mask 78 vis-á-vis its positioning with the reference component 50 and the test component 52, or their images 82 and 80.

Figure 5A:
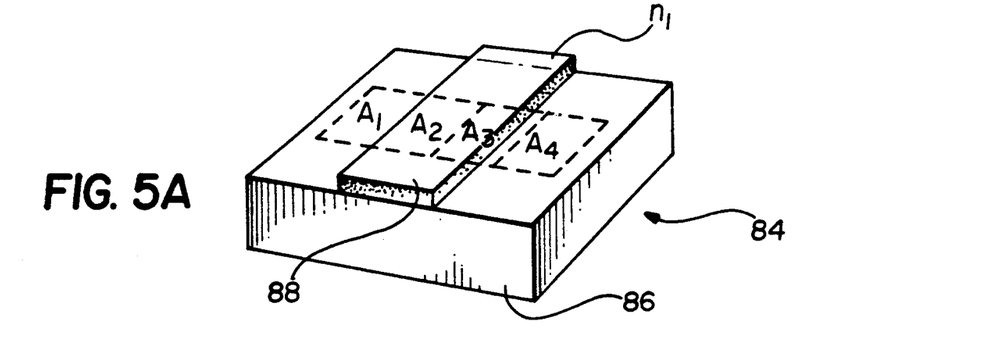
FIGS. 5A-5D show masks that can be used in the steps of the present invention.

A FIG. 5A mask 84 comprises a squared glass substrate 86 and an overlay 88 having an index of refraction $n_1$. The index $n_2$ is that of air, or 1.0. The overlay 88, in fact, overlaps sub-regions $A_3$, $A_2$, thus overlapping top and lower portions of the reference component image 82 and the test component image 80, respectively.

Figure 5B:
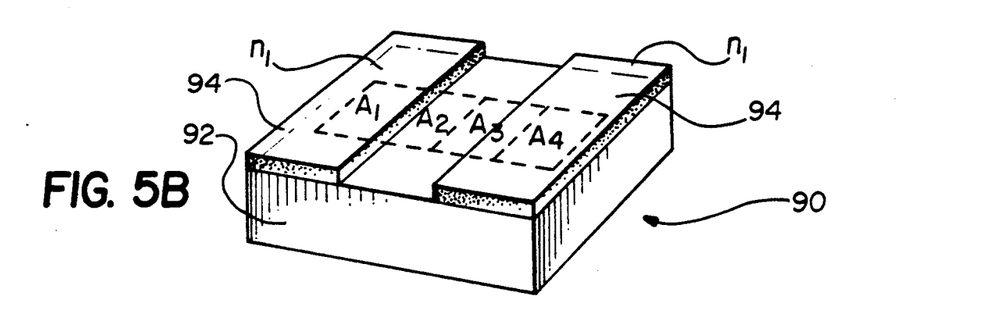

A FIG. 5B mask 90 comprises a squared glass substrate 92 and a "split" overlay 94 having an index of refraction $n_1$. Here, the overlay 94 is "split" in the sense that it overlaps a bottom and top portion of the reference component image 82 and the test component image 80, respectively.

Figure 5C:
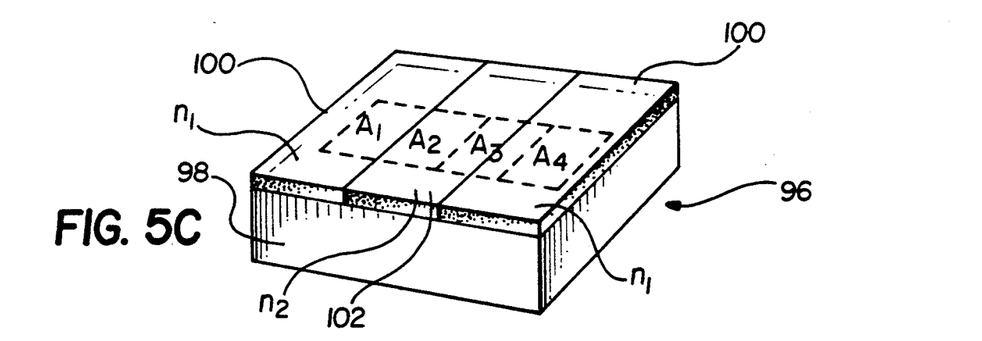

A FIG. 5C mask 96 comprises a squared glass substrate 98 and two overlays 100, 102, of the same thickness, having indices of refraction $n_1$, $n_2$, respectively. Here, the overlays 100 overlap the bottom of the reference component image 82, and the top of the test component image 80, and the overlay 102 overlaps the top of the reference component image 82 and the bottom of the test component image 80.

Figure 5D:
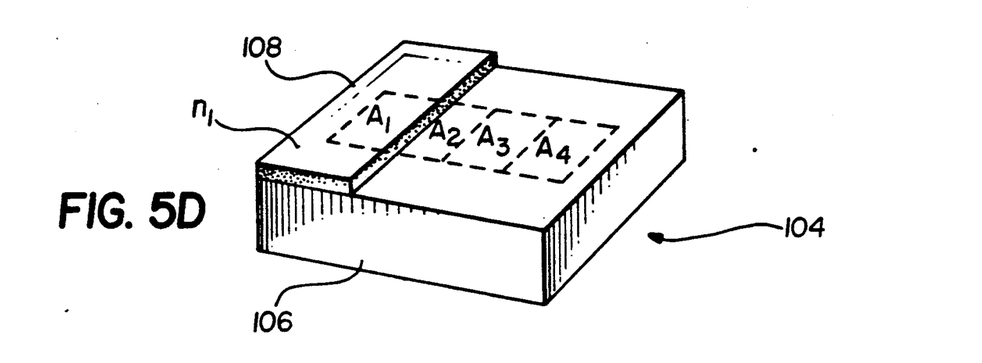

A FIG. 5D mask 104 comprises a squared glass substrate 106 and an overlay 108 having an index of refraction $n_1$. Here, the overlay 108 overlaps the top and bottom portion of the test component image 80, only.

Step 2: Masking At Least One Portion of at Least One of the Reference Component and the Test Component, so that a Portion of the Imaged Radiation Beam Incurs a Predetermined and Differential Phase Retardation, Relative to Another Portion of the Beam Passing through the Mask, thereby Creating a Real Time Masked Image.

Assume now, for the sake of pedagogy, that the FIG. 5A mask 84 is inserted in the FIG. 4 optical assembly 48 (and in lieu of the mask 78). Recall, furthermore, that the mask 84 is constructed so that it comprises a phase retardant overlay 88, and that this overlay 88 is spatially configured so that when the mask 84 is inserted in the FIG. 4 optical assembly 48, the phase retardant overlay 88 equally overlaps the top and lower portions of the reference component image 82 and the test component image 80, respectively.

This action, therefore, inherently satisfies step 2, i.e., I have masked preselected portions of the test component image 80 and the reference component image 82, so that a portion of the radiation beam imaged by the masked portions of the test component 52 and the reference component 50, incurs a predetermined and differential phase retardation ($\phi_2$) relative to unmasked portions ($\phi_1$).

All other radiation incident on the mask, outside of the areas $A_1$ through $A_4$, is blocked by an opaque screen. The radiation passing through the mask 84, on the other hand, continues through the lens 66 to form an image at 68, which I call a real time masked image. The real time masked image, as detected by the FIG. 4 CCD photodetector 72, can generate a real time image photon intensity distribution, or real time point spread function (PSF).

An Interpolation: Motivation For Step 3

An interpolation between Step 2 and 3 is now provided, in order to provide a motivation and a deeper understanding of Step 3.

I begin by noting that Step 2 introduces the notion of a real time point spread function, generated by intercepting the radiation beam in the FIG. 4 optical assembly 48, with a specially constructed phase retardant mask, in fact, the mask 84 designed in accordance with FIG. 5A.

Figure 6:
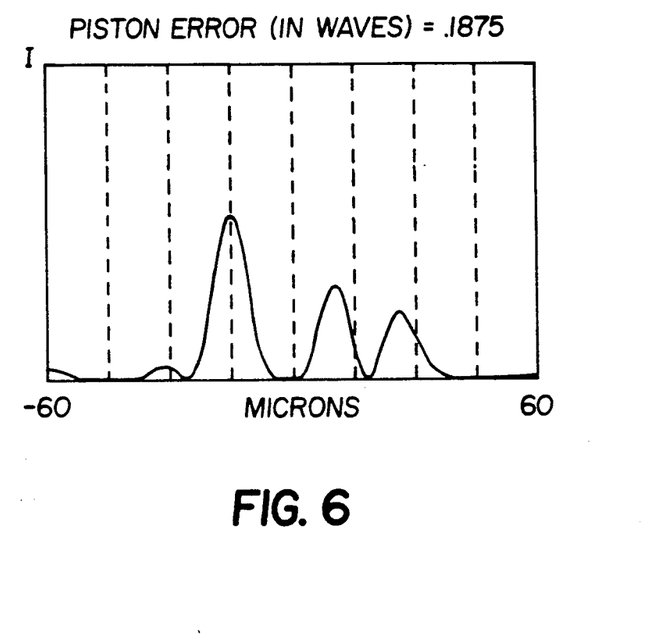
FIG. 6 shows a point spread function generated in accordance with the first and second steps of the present invention.

FIG. 6 shows this point spread function: it is a plot of photon intensity I versus spatial distance (in microns) as measured across the FIG. 4 photodetector 72.

The FIG. 6 point spread function also contains, although within an embedded context, the quantitative information as to how much piston has been introduced into the FIG. 4 optical assembly 48, due to the (above stated) arbitrary displacement D between the reference component 50 and the test component 52. Step 3, in conjunction with Steps 1 and 2, provides a solution to this question of "how much" piston. Why the Steps 1–3 can provide an answer to this question of "how much" piston may be satisfied by stepping back for a moment from the previous detail, and considering the following.

Figure 7A:
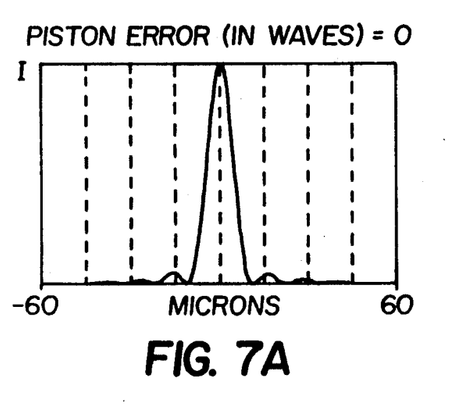
FIGS. 7A-7I show point spread functions generated for the FIG. 4 assembly, but without the masking steps of the present invention.
Figure 7B:
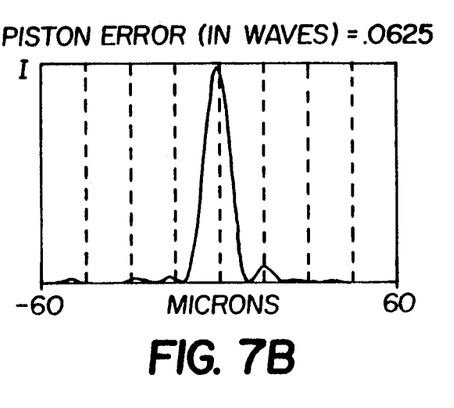
Figure 7C:
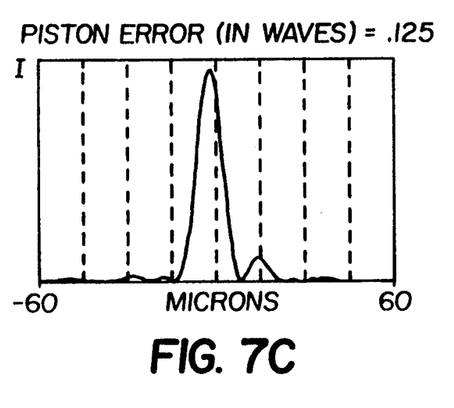
Figure 7D:
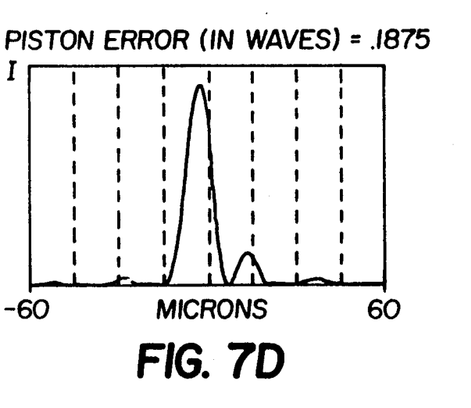

Imagine, firstly, that the FIG. 4 optical assembly 48 is modified so that there is no piston between the reference component 50 and the test component 52 and, that there is no phase delay in any portion of a mask. Then, everything else being the same, a point spread function for this case is of the type shown in FIG. 7A, namely an ideal point spread function.

Imagine, secondly, that the test component 52 begins to move through a series of known displacements $\Delta X$ with respect to the reference component 50, thus introducing piston (e.g., 1/16, ⅛ wave, ¼ wave, ⅜ wave, ½ wave). The sequence of known displacements $\Delta X$ results, in turn, in a sequence of point spread functions, shown in FIGS. 7B-I.

I have made the following two observations about the FIGS. 7A-I point spread functions.

Figure 7E:
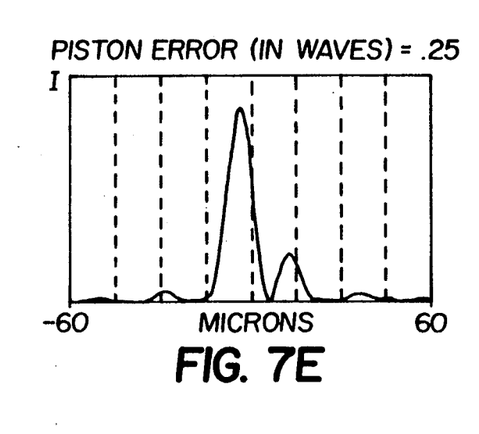
Figure 7F:
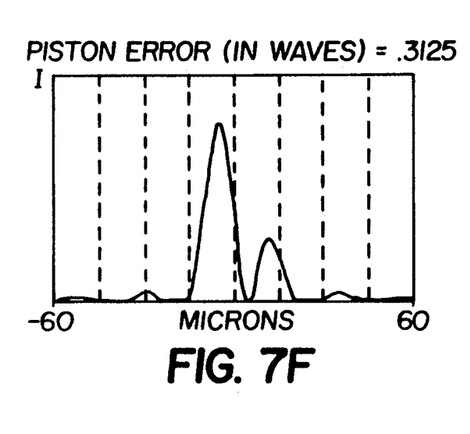
Figure 7G:
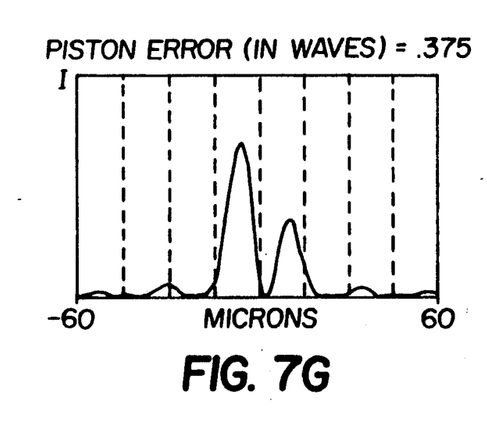
Figure 7H:
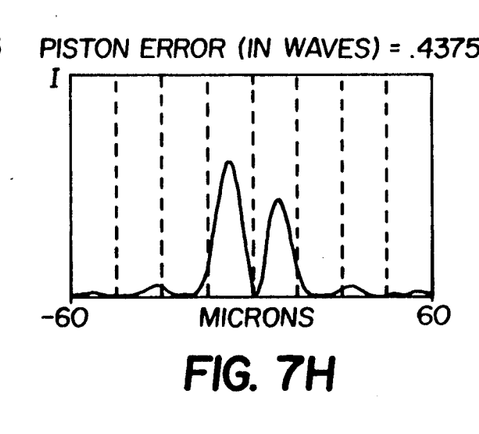
Figure 7I:
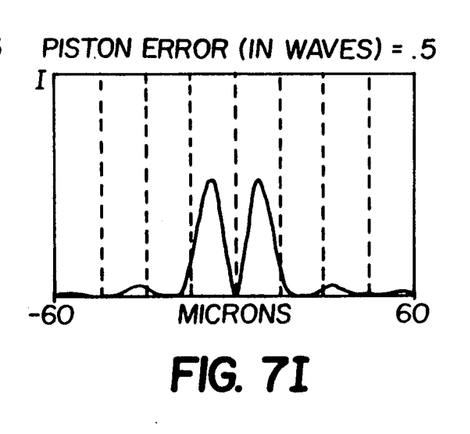
Figure 8A:
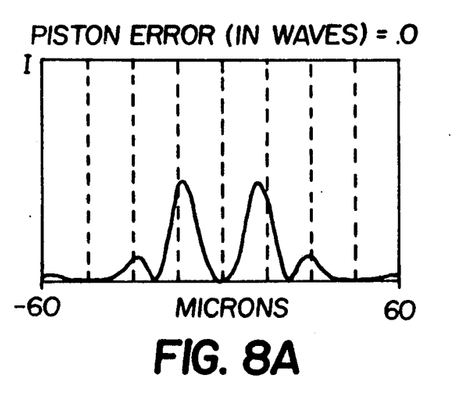
FIGS. 8A-8I show the FIG. 7 point spread functions, modified in accordance with masking steps of the present invention.
Figure 8B:
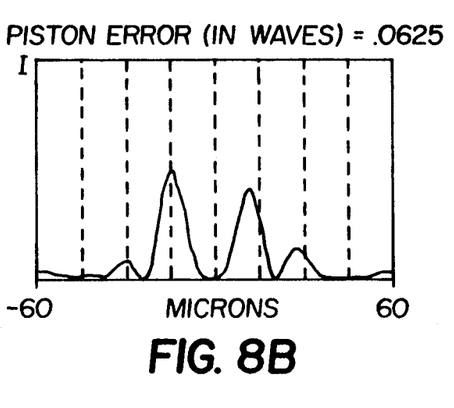
Figure 8C:
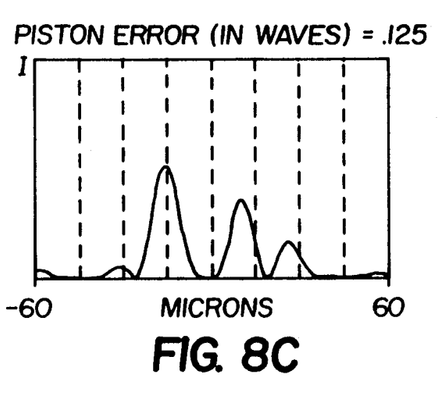
Figure 8D:
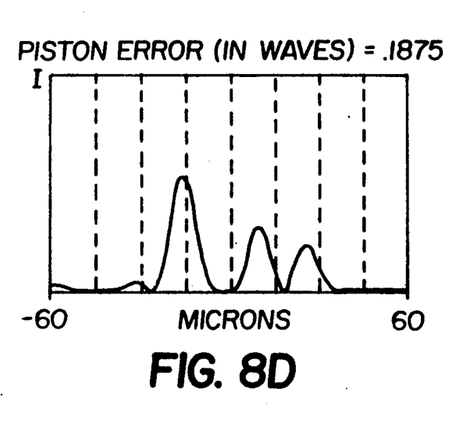
Figure 8E:
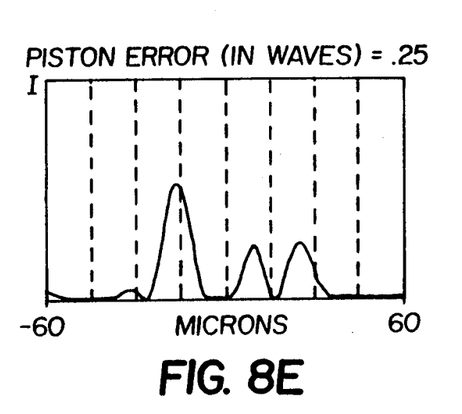
Figure 8F:
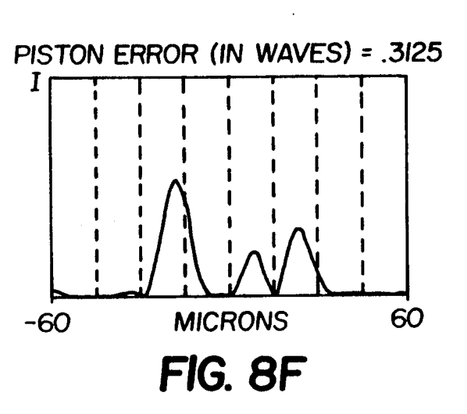
Figure 8G:
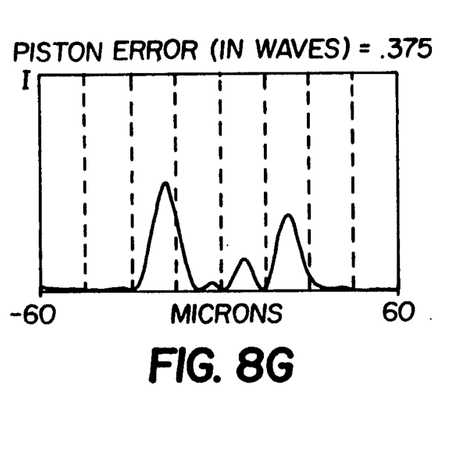
Figure 8H:
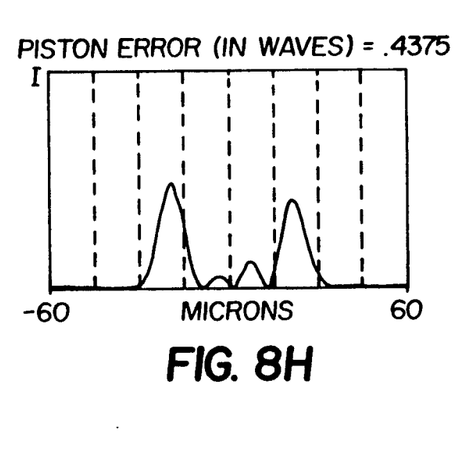
Figure 8I:
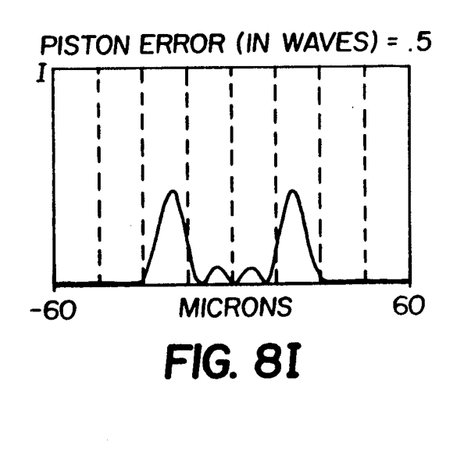

First, empirically, as one scans the sequence, so that the magnitude of the waves increases (FIGS. 7A-I), it can be observed that energy is gradually redistributed from a large center peak, with negligible side lobes (FIGS. 7A, B, C, D), until, with a further increase in magnitude of wave, the energy is predominantly located in the side lobes (FIGS. 7E, F, G, H, I).

Now, secondly, since a quantitative determination of piston may be based on precisely quantifying the sidelobe energy distribution, it is clear from FIG. 7 that this precision may be qualified for those cases where a signal to background noise ratio is low in the area of interest, i.e., where the energy is predominantly in the center, and not in the side lobes. But this last situation is precisely the case for determinations of piston which are especially of interest for the present invention, namely, where the piston is very small, for example, less than ¼ wave. On the other hand, a required precision may be enhanced for the cases where the signal to noise ratio is high in the area of interest, i.e., for the cases of relatively large piston, e.g., approaching ½ wave, where the energy is predominantly located in the side lobes.

In recognition of these two observations, I modify the point spread function by way of introducing a phase delay in a portion of the transmitted beam (by way of my masking steps FIGS. 5A-C), as described in steps 1 and 2, such that a new family of point spread functions may be defined as shown in FIG. 8. In this way, therefore, one can move the "window" of analysis of the point spread function, in a known way, from the less precise regions (low signal to noise ratio), to a more Precise region (high signal to noise ratio), so that, in effect, one always has access to a high signal to noise ratio, even for the cases of arbitrarily small piston, i.e., much less than ¼ wave, for example, 1/32 wave. (Note that for the case of the FIG. 5D mask, its utility is such that it shifts the window of analysis by one half wave, so that FIG. 7I corresponds to the case where there is no piston present.)

Step 3: Comparing the Real Time Masked Image Against a Family of Off-line Images Generated for a Sequence of Known Petal Position Errors, for Determining the Magnitude of the Real Time Test Component Piston.

Step 3 comprises several independent notions, two of which have been developed above.

First, "the real time masked image" (and its corresponding point spread function), has been developed above, in Step 2 and FIG. 6. This real time masked image, it is recalled, is generated by the FIG. 4 optical assembly 48 for the case of an arbitrary displacement D between the reference component 50 and the test component 52, and with the phase retardant mask 84 in place. It is now required to precisely determine how much piston has been induced by this displacement D.

Second, Step 3 requires comparing this real time masked image, against a family of off-line images, generated for a sequence of known petal positions. This action, actually, has already been effected in part, since the family of point spread functions FIG. 8, developed above in the interpolation section, provides a required family of off-line images generated for a sequence of known petal positions.

Figure 9:
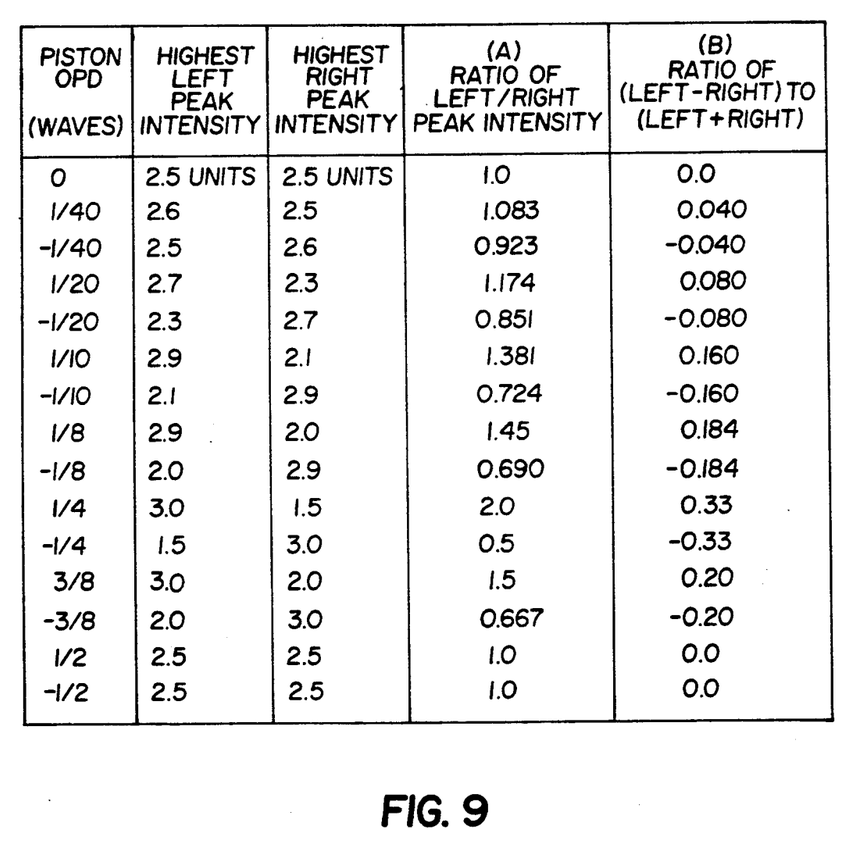
FIG. 9 is a Table subsuming information set forth in the FIG. 8 point spread functions.

Information subsumed by the FIG. 8 point spread functions is re-formatted in a Table, FIG. 9. The Table columns are dedicated to OPD (waves), maximum left and right peak intensities, and two algebraic ratios (to be explained below).

Figure 10A:
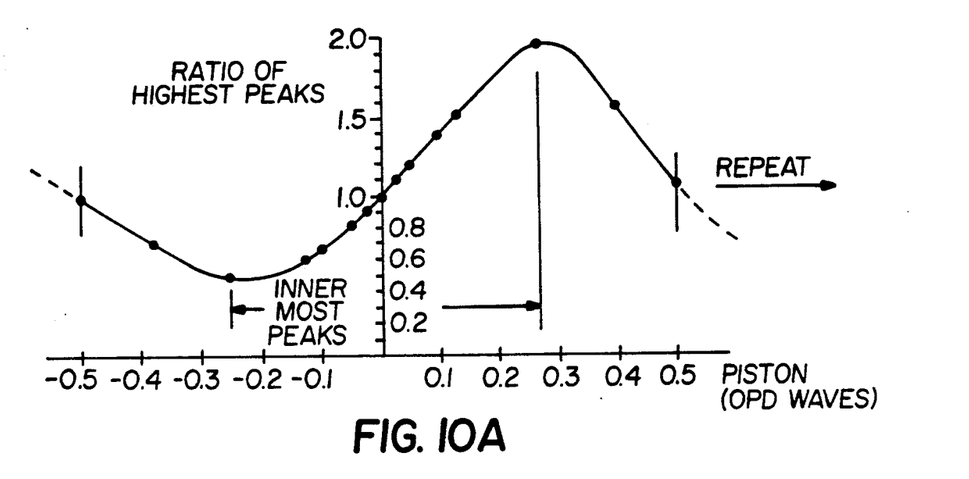
FIGS. 10A, 10B are a set of point spread function intensity curves derived from the FIG. 9 Table.

The information subsumed by the FIG. 8 point spread functions has been re-formatted in the FIG. 9 Table, as an intermediate step, to the end of plotting points assigned by the Table, onto a set of PSF intensity ratio curves shown in FIGS. 10A, B. The FIG. 10 curves, accordingly, each plot intensity ratio versus piston (OPD) waves, for the family of known petal position errors.

Figure 10B:
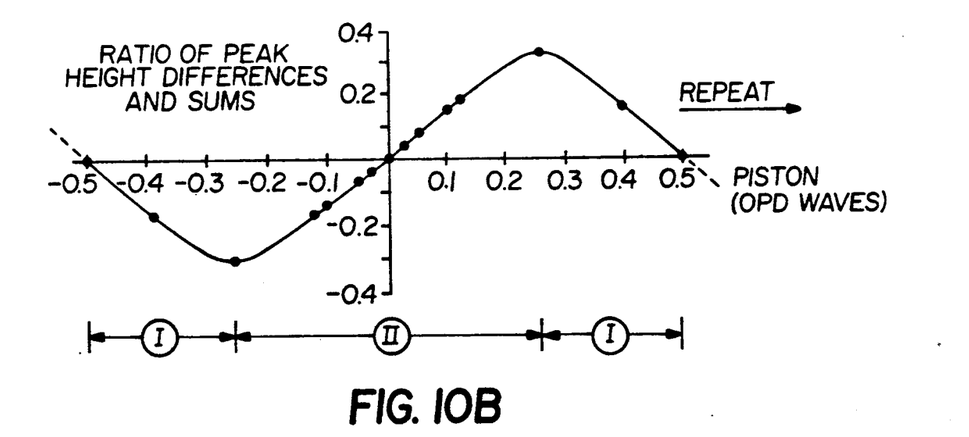

Step 3, finally, requires comparing the real time masked image (FIG. 6) against the family of off-line images, now captured in the FIG. 10 curves. This comparison can be done in at least two different ways (hence, FIG. 10A, FIG. 10B). The difference is based on which of the two algebraic ratios (from the Table, columns A, B) is selected, the second ratio being preferred, since it can yield an enhanced precision. The step of comparison is now further explained, therefore, with reference to FIG. 10B, and by way of the following algorithm.

Examination of FIG. 10B shows that it has been split into first (I) and second (II) regimes. The computer 74 can be programmed to ask: Is the FIG. 6 point spread function within the first (I) or second (II) regime? This interrogation is done to avoid ambiguity. The question may be answered by empirically determining how far apart are the FIG. 6 dominant peaks. Thus: if the distance between the two dominant peaks is greater than a specified $\epsilon$, one continues the algorithm in the first (I) regime. On the other hand, if the distance between the two dominant peaks is less than a specified $\epsilon$, one continues the algorithm in the second (II) regime.

Finally, within a determined regime, I or II, the required measurement of the piston introduced by the arbitrary displacement D, is mapped by first locating on the ordinate a number determined by algebraically computing the FIG. 6 measure of:

$$\frac{\text{left peak intensity} - \text{right peak intensity}}{\text{left peak intensity} + \text{right peak intensity}} = \frac{\text{ordinate}}{\text{parameter}},$$

and then mapping the ordinate parameter to the curve and its correspondent on the abscissa, namely, the piston (in optical path difference).

What is claimed is:

1. A method suitable for determining piston in a segmented imaging assembly, the assembly comprising
   (a) a source of radiation that can output a radiation beam; and
   (b) a segmented imaging system comprising a reference component and a test component, which components can be used to form an imaged radiation beam;

the steps of the method of the present invention comprising:
   1) intercepting preselected portions of the imaged radiation beam with a mask;
   2) masking at least one portion of at least one of the reference component and the test component, so that a portion of the imaged radiation beam incurs a predetermined and differential phase retardation relative to another portion of the beam passing through the mask, thereby creating a real time masked image; and
   3) comparing the real time masked image against a family of off-line images generated for a sequence of known petal position errors, for determining the magnitude of the real time test component piston.

2. A method according to claim 1, comprising intercepting the imaged radiation in a region substantially at a conjugate image plane of the reference component.

3. A method according to claim 1, wherein step 3 comprises:
   (i) transforming the real time masked image into a corresponding point spread function;
   (ii) transforming the family of off-line images into corresponding point spread functions; and
   (iii) comparing the point spread function (i) against the family of off-line point spread functions (ii), for determining the magnitude of the real time test component piston.

4. A method according to claim 1, in which the phase delay of the masking step 2 is approximately one-half wave of optical path difference of the source of radiation.

5. A method according to claim 1, in which the masking step 2 comprises masking the entire extent of at least one of the reference and test components.

6. A method according to claim 3, wherein the masking step 2 comprises introducing a phase retardation for generating the family of off-line point spread functions, so that the PSF are characterized by predominant intensity side-lobes in the vicinity of zero piston.

7. A method according to claim 6, comprising the step of generating a PSF intensity ratio curve from the family of off-line point spread functions.

8. A method according to claim 7, comprising mapping a real time masked image point spread function intensity to the intensity ratio curve, for quantitatively determining the magnitude of the real time test component piston.

* * * * *